(12) United States Patent
Baur

(10) Patent No.: US 10,960,822 B2
(45) Date of Patent: Mar. 30, 2021

(54) VEHICULAR REARVIEW VISION SYSTEM WITH A-PILLAR DISPLAY

(71) Applicant: MAGNA MIRRORS OF AMERICA, INC., Holland, MI (US)

(72) Inventor: Michael J. Baur, Kentwood, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/693,509

(22) Filed: Nov. 25, 2019

(65) Prior Publication Data

US 2020/0094744 A1  Mar. 26, 2020

Related U.S. Application Data

(63) Continuation of application No. 15/210,222, filed on Jul. 14, 2016, now Pat. No. 10,486,599.

(60) Provisional application No. 62/266,048, filed on Dec. 11, 2015, provisional application No. 62/215,941, filed on Sep. 9, 2015, provisional application No. 62/193,913, filed on Jul. 17, 2015.

(51) Int. Cl.
  *B60R 1/12* (2006.01)
  *B60R 1/06* (2006.01)
  *B60R 1/00* (2006.01)

(52) U.S. Cl.
  CPC .............. *B60R 1/12* (2013.01); *B60R 1/00* (2013.01); *B60R 1/007* (2013.01); *B60R 1/06* (2013.01); *B60R 2001/1253* (2013.01); *B60R 2300/802* (2013.01); *B60R 2300/8026* (2013.01); *B60R 2300/8066* (2013.01)

(58) Field of Classification Search
  CPC .... B60R 1/00; B60R 1/08; B60R 1/06; B60R 2300/802; B60R 2300/8026
  See application file for complete search history.

(56) References Cited

U.S. PATENT DOCUMENTS

| | | | |
|---|---|---|---|
| 4,439,013 | A | 3/1984 | Hagn et al. |
| 4,793,690 | A | 12/1988 | Gahan et al. |
| 4,815,689 | A | 3/1989 | Schiff |
| 5,193,029 | A | 3/1993 | Schofield et al. |
| 5,285,060 | A | 2/1994 | Larson et al. |
| 5,416,313 | A | 5/1995 | Larson et al. |
| 5,446,576 | A | 8/1995 | Lynam et al. |
| 5,530,240 | A | 6/1996 | Larson et al. |
| 5,550,677 | A | 8/1996 | Schofield et al. |

(Continued)

*Primary Examiner* — Brian P Yenke
(74) *Attorney, Agent, or Firm* — Honigman LLP

(57) ABSTRACT

A vehicular rearview vision system includes a driver-side display device disposed at an interior driver side region of a vehicle and viewable by a driver of the vehicle, a first camera disposed at the vehicle so as to have at least a rearward and sideward field of view, and a second camera disposed at a driver side of the vehicle so as to have at least a sideward and forward field of view that at least partially views an A-pillar blind spot region forward and sideward of a driver-side A-pillar of the vehicle. The driver-side display device displays video images derived from image data captured by the first camera, and the driver-side display device displays driver-side A-pillar blind spot video images derived from image data captured by the second camera. The displayed rearview video images may be at least partially surrounded by the displayed driver-side A-pillar blind spot video images.

25 Claims, 10 Drawing Sheets

(56) References Cited

U.S. PATENT DOCUMENTS

| | | |
|---|---|---|
| 5,594,593 A | 1/1997 | Milner |
| 5,610,756 A | 3/1997 | Lynam et al. |
| 5,617,245 A | 4/1997 | Milner |
| 5,668,663 A | 9/1997 | Varaprasad et al. |
| 5,670,935 A | 9/1997 | Schofield et al. |
| 5,724,187 A | 3/1998 | Varaprasad et al. |
| 5,760,962 A | 6/1998 | Schofield et al. |
| 5,786,772 A | 7/1998 | Schofield et al. |
| 5,796,094 A | 8/1998 | Schofield et al. |
| 5,808,777 A | 9/1998 | Lynam et al. |
| 5,877,897 A | 3/1999 | Schofield et al. |
| 5,914,815 A | 6/1999 | Bos |
| 5,929,786 A | 7/1999 | Schofield et al. |
| 5,949,331 A | 9/1999 | Schofield et al. |
| 6,201,642 B1 | 3/2001 | Bos |
| 6,222,447 B1 | 4/2001 | Schofield et al. |
| 6,302,545 B1 | 10/2001 | Schofield et al. |
| 6,329,925 B1 | 12/2001 | Skiver et al. |
| 6,396,397 B1 | 5/2002 | Bos et al. |
| 6,420,975 B1 | 7/2002 | DeLine et al. |
| 6,428,172 B1 | 8/2002 | Hutzel et al. |
| 6,498,620 B2 | 12/2002 | Schofield et al. |
| 6,511,192 B1 | 1/2003 | Henion et al. |
| 6,523,964 B2 | 2/2003 | Schofield et al. |
| 6,535,242 B1 | 3/2003 | Strumolo et al. |
| 6,611,202 B2 | 8/2003 | Schofield et al. |
| 6,636,258 B2 | 10/2003 | Strumolo |
| 6,690,268 B2 | 2/2004 | Schofield et al. |
| 6,717,610 B1 | 4/2004 | Bos et al. |
| 6,757,109 B2 | 6/2004 | Bos |
| 6,802,617 B2 | 10/2004 | Schofield et al. |
| 6,806,452 B2 | 10/2004 | Bos et al. |
| 6,822,563 B2 | 11/2004 | Bos et al. |
| 6,882,287 B2 | 4/2005 | Schofield |
| 6,891,563 B2 | 5/2005 | Schofield et al. |
| 6,902,284 B2 | 6/2005 | Hutzel et al. |
| 6,932,483 B2 | 8/2005 | Strumolo et al. |
| 6,946,978 B2 | 9/2005 | Schofield |
| 7,005,974 B2 | 2/2006 | McMahon et al. |
| 7,038,577 B2 | 5/2006 | Pawlicki et al. |
| 7,046,448 B2 | 5/2006 | Burgner |
| 7,145,519 B2 | 12/2006 | Takahashi et al. |
| 7,161,616 B1 | 1/2007 | Okamoto et al. |
| 7,184,190 B2 | 2/2007 | McCabe et al. |
| 7,195,381 B2 | 3/2007 | Lynam et al. |
| 7,230,640 B2 | 6/2007 | Regensburger et al. |
| 7,248,283 B2 | 7/2007 | Takagi et al. |
| 7,255,451 B2 | 8/2007 | McCabe et al. |
| 7,274,501 B2 | 9/2007 | McCabe et al. |
| 7,295,229 B2 | 11/2007 | Kumata et al. |
| 7,301,466 B2 | 11/2007 | Asai |
| 7,338,177 B2 | 3/2008 | Lynam |
| 7,370,983 B2 | 5/2008 | DeWind et al. |
| 7,400,435 B2 | 7/2008 | Byers et al. |
| 7,576,767 B2 | 8/2009 | Lee et al. |
| 7,592,928 B2 | 9/2009 | Chinomi et al. |
| 7,640,108 B2 | 12/2009 | Shimizu et al. |
| 7,720,580 B2 | 5/2010 | Higgins-Luthman |
| 7,728,879 B2 | 6/2010 | Ishii |
| 7,734,392 B2 | 6/2010 | Schofield et al. |
| 7,855,755 B2 | 12/2010 | Weller et al. |
| 7,859,565 B2 | 12/2010 | Schofield et al. |
| 7,881,496 B2 | 2/2011 | Camilleri et al. |
| 8,058,977 B2 | 11/2011 | Lynam |
| 8,144,033 B2 | 3/2012 | Chinomi et al. |
| 8,331,038 B1 | 12/2012 | Snow et al. |
| 8,491,137 B2 | 7/2013 | Lynam et al. |
| 8,506,097 B2 | 8/2013 | Kukita et al. |
| 8,830,319 B2 | 9/2014 | Stegmann et al. |
| 8,842,176 B2 | 9/2014 | Schofield et al. |
| 8,885,045 B2* | 11/2014 | Yanagi .................... B60R 1/00 348/148 |
| 8,890,955 B2 | 11/2014 | Peterson |
| 8,917,437 B2 | 12/2014 | Baur et al. |
| 9,041,806 B2 | 5/2015 | Baur et al. |
| 9,139,135 B2 | 9/2015 | Assaf |
| 9,242,602 B2 | 1/2016 | Corcoran et al. |
| 9,332,231 B2* | 5/2016 | Lee .......................... B60R 1/00 |
| 9,509,957 B2 | 11/2016 | Higgins-Luthman et al. |
| 9,598,012 B2* | 3/2017 | Nagata ................. H04N 7/181 |
| 9,598,015 B1 | 3/2017 | Pertsel et al. |
| 9,654,687 B2 | 5/2017 | Varonos |
| 9,712,791 B2 | 7/2017 | Kim et al. |
| 9,762,880 B2 | 9/2017 | Pflug |
| 9,779,313 B2 | 10/2017 | Pliefke et al. |
| 9,789,821 B2 | 10/2017 | Baur et al. |
| 10,486,599 B2 | 11/2019 | Baur |
| 10,604,081 B2* | 3/2020 | Wang ....................... B60R 1/00 |
| 2002/0105741 A1 | 8/2002 | Platzer |
| 2005/0146607 A1 | 7/2005 | Linn et al. |
| 2005/0168695 A1* | 8/2005 | Ooba ....................... B60R 1/00 353/13 |
| 2005/0248859 A1 | 11/2005 | Platzer |
| 2006/0029255 A1 | 2/2006 | Ozaki |
| 2006/0050018 A1 | 3/2006 | Hutzel et al. |
| 2006/0061008 A1 | 3/2006 | Karner et al. |
| 2006/0192660 A1 | 8/2006 | Watanabe et al. |
| 2007/0003162 A1* | 1/2007 | Miyoshi ................. G08G 1/167 382/276 |
| 2007/0081262 A1* | 4/2007 | Oizumi ..................... B60R 1/00 359/843 |
| 2008/0011733 A1 | 1/2008 | Rawlings |
| 2008/0106389 A1 | 5/2008 | Desai |
| 2008/0239527 A1* | 10/2008 | Okabe .................... B60Q 9/008 359/843 |
| 2009/0015736 A1 | 1/2009 | Weller et al. |
| 2010/0066833 A1 | 3/2010 | Ohshima et al. |
| 2010/0079881 A1 | 4/2010 | Lynam et al. |
| 2010/0134325 A1 | 6/2010 | Gomi et al. |
| 2010/0194596 A1 | 8/2010 | Wang et al. |
| 2010/0220189 A1 | 9/2010 | Yanagi |
| 2010/0245577 A1 | 9/2010 | Yamamoto et al. |
| 2011/0090073 A1* | 4/2011 | Ozaki ....................... B60R 1/00 340/435 |
| 2011/0286096 A1 | 11/2011 | Dykhouse |
| 2012/0026012 A1* | 2/2012 | Yamashita ................ B60R 1/00 340/904 |
| 2012/0154591 A1 | 6/2012 | Baur et al. |
| 2012/0314075 A1 | 12/2012 | Cho |
| 2013/0002877 A1 | 1/2013 | Miyoshi et al. |
| 2014/0240811 A1 | 8/2014 | Baur |
| 2014/0267731 A1 | 9/2014 | Izumikawa |
| 2014/0285666 A1 | 9/2014 | O'Connell et al. |
| 2014/0292805 A1 | 10/2014 | Yamada et al. |
| 2014/0333770 A1 | 11/2014 | Baur |
| 2015/0002954 A1 | 1/2015 | Lynam et al. |
| 2015/0022665 A1 | 1/2015 | Lu |
| 2015/0042803 A1 | 2/2015 | Heinemann et al. |
| 2015/0097954 A1 | 4/2015 | An et al. |
| 2015/0103173 A1 | 4/2015 | Takaki |
| 2015/0139499 A1 | 5/2015 | Shimizu |
| 2015/0217692 A1 | 8/2015 | Yanagawa |
| 2015/0232028 A1 | 8/2015 | Reardon |
| 2015/0251602 A1 | 9/2015 | Baur et al. |
| 2015/0258937 A1* | 9/2015 | Wen ........................ B60R 1/00 348/148 |
| 2015/0336511 A1 | 11/2015 | Ukeda |
| 2015/0353011 A1 | 12/2015 | Baek et al. |
| 2016/0027158 A1 | 1/2016 | An et al. |
| 2016/0094808 A1 | 3/2016 | Cerri et al. |
| 2016/0119586 A1 | 4/2016 | Riad et al. |
| 2016/0144785 A1* | 5/2016 | Shimizu .................. B60K 35/00 340/435 |
| 2016/0182823 A1 | 6/2016 | Murasumi et al. |
| 2016/0196823 A1 | 7/2016 | Yellambalase |
| 2016/0200254 A1* | 7/2016 | Raab ..................... H04N 5/247 348/148 |
| 2016/0240169 A1* | 8/2016 | Tamura ................... G09G 5/006 |
| 2016/0288710 A1 | 10/2016 | Brandl et al. |
| 2016/0297362 A1 | 10/2016 | Tijerina et al. |
| 2016/0339841 A1* | 11/2016 | Kondo .................... G02B 27/01 |
| 2016/0350974 A1 | 12/2016 | Hashimoto et al. |
| 2016/0368418 A1 | 12/2016 | Suenaga et al. |

(56) References Cited

U.S. PATENT DOCUMENTS

| | | |
|---|---|---|
| 2016/0375829 A1 | 12/2016 | Lang et al. |
| 2017/0026618 A1 | 1/2017 | Mitsuta et al. |
| 2017/0054974 A1 | 2/2017 | Pliefke |
| 2017/0129405 A1* | 5/2017 | Oba .................... B60R 1/08 |
| 2017/0140699 A1 | 5/2017 | Okohira |
| 2017/0144601 A1 | 5/2017 | Martinson et al. |
| 2017/0148136 A1 | 5/2017 | Lee et al. |
| 2017/0161566 A1 | 6/2017 | Sung et al. |
| 2017/0237882 A1 | 8/2017 | Shiohara |
| 2017/0259741 A1 | 9/2017 | Kondo et al. |
| 2017/0297488 A1* | 10/2017 | Wang .................... G06T 5/006 |
| 2017/0302855 A1 | 10/2017 | Usui et al. |
| 2017/0327039 A1 | 11/2017 | Kimura |
| 2017/0330531 A1* | 11/2017 | Yamazaki .............. G09G 5/14 |
| 2018/0005529 A1 | 1/2018 | Edelstein |
| 2018/0056870 A1 | 3/2018 | Kosugi et al. |
| 2018/0109764 A1 | 4/2018 | Schofield et al. |
| 2018/0111553 A1 | 4/2018 | Kubota et al. |
| 2018/0154831 A1 | 6/2018 | Spencer et al. |
| 2018/0301115 A1* | 10/2018 | Wang .................... G09G 5/14 |
| 2019/0031102 A1* | 1/2019 | Kishimoto .......... H04N 5/232 |
| 2019/0052843 A1 | 2/2019 | Izumi et al. |
| 2019/0088011 A1* | 3/2019 | Liu ...................... G06T 17/05 |
| 2019/0100157 A1* | 4/2019 | Wang ................ B60R 11/0235 |
| 2019/0161014 A1* | 5/2019 | Ko ...................... B60R 1/074 |
| 2020/0003571 A1* | 1/2020 | Shirakawa .......... G06Q 50/10 |
| 2020/0039435 A1* | 2/2020 | Chang .................... B60R 1/00 |
| 2020/0241624 A1* | 7/2020 | Iwaki .................. G02F 1/13338 |
| 2020/0252573 A1* | 8/2020 | Bax ..................... H04N 5/44504 |

* cited by examiner

//br>
VEHICULAR REARVIEW VISION SYSTEM WITH A-PILLAR DISPLAY

CROSS REFERENCE TO RELATED APPLICATIONS

The present application is a continuation of U.S. patent application Ser. No. 15/210,222, filed Jul. 14, 2016, now U.S. Pat. No. 10,486,599, which claims the filing benefits of U.S. provisional applications, Ser. No. 62/266,048, filed Dec. 11, 2015, Ser. No. 62/215,941, filed Sep. 9, 2015, and Ser. No. 62/193,913, filed Jul. 17, 2015, which are hereby incorporated herein by reference in their entireties.

FIELD OF THE INVENTION

The present invention relates generally to the field of exterior rearview systems for vehicles.

BACKGROUND OF THE INVENTION

It is known to provide an automotive rearview mirror assembly that provides a rearview at the side and rear of a vehicle to a driver of the vehicle. It is also known to provide a rear vision system that utilizes rearward facing cameras that capture images of the side and rear areas of the vehicle for display of the captured images to the driver of the vehicle. An example of a known rearview system is shown in FIG. 1, where the vehicle has two exterior rearview mirror assemblies having reflective elements (such as those shown in FIGS. 2 and 3) that provide a rearward field of view to the driver that meets the regulatory requirements and that provide a selected wide view or wide angle view (such as via an aspheric or blind zone spotter mirror element) outboard of the regulatory field of view.

There have been many efforts to enhance vehicle visibility through the use of camera monitoring systems as well as through the use of additional specialized mirrors. Examples in the market today include backup/reverse aid cameras for camera monitoring systems and blind zone mirrors and/or the like. Efforts to completely replace mirrors with cameras have continued to take place as well. Examples of such proposed camera/mirror constructions are described in U.S. Pat. Nos. 5,550,677; 5,760,962 and/or 5,670,935, which are hereby incorporated herein by reference in their entireties.

SUMMARY OF THE INVENTION

The present invention provides a rearview vision system comprising a centrally mounted rearward viewing camera and side rearview mirror assemblies mounted at respective sides of an equipped vehicle. The camera is centrally located at the vehicle and has a rearward field of view that encompasses the area rearward and sideward of the vehicle that is required by regulations for side exterior rearview mirror assemblies, while the side rearview mirror assemblies comprise aspheric or curved reflective elements that provide a blind spot or wide angle field of view to the driver viewing the side rearview mirror assemblies. The camera and side mirror assemblies thus cooperate to provide the small regulation required rearward field of view to the driver of the vehicle, while also providing a desired wide angle or blind spot viewing field of view. Thus, the system utilizes only a single rearward viewing camera and two small wide angle exterior rearview mirror assemblies.

These and other objects, advantages, purposes and features of the present invention will become apparent upon review of the following specification in conjunction with the drawings.

DESCRIPTION OF THE PREFERRED EMBODIMENTS

Figure 4:
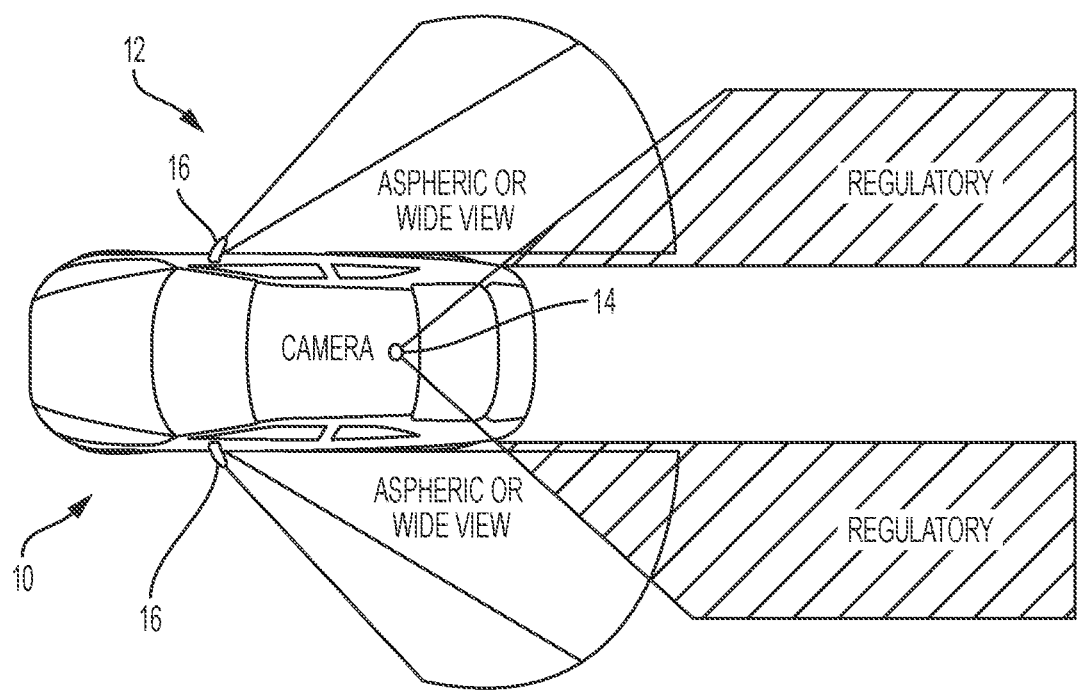
FIG. 4 is a plan view of a vehicle showing a rear vision system having two side exterior wide view mirrors that provide a selected wide angle field of view and a single centrally located camera that provides a regulation required rearward field of view in accordance with the present invention.

Referring now to the drawings and the illustrative embodiments depicted therein, a vehicle 10 includes a rearvision system 12 that includes a single centrally located camera 14 and opposite side exterior wide view or spotter mirrors 16 (FIG. 4). The camera 14 is operable to capture images rearward and sideward of the vehicle that at least partially or substantially encompass the required regulatory field of view for exterior rearview mirrors. The captured images are communicated to a processor and/or display device of the vehicle to display video images of the scene sideward and rearward of the vehicle to the driver of the vehicle while the driver is normally operating the vehicle. The display device may be at the interior rearview mirror assembly of the vehicle or may comprise a console display or door mounted display or the like, where by the displayed images are readily viewable by the driver of the vehicle while the driver is normally operating the vehicle.

Figure 1:
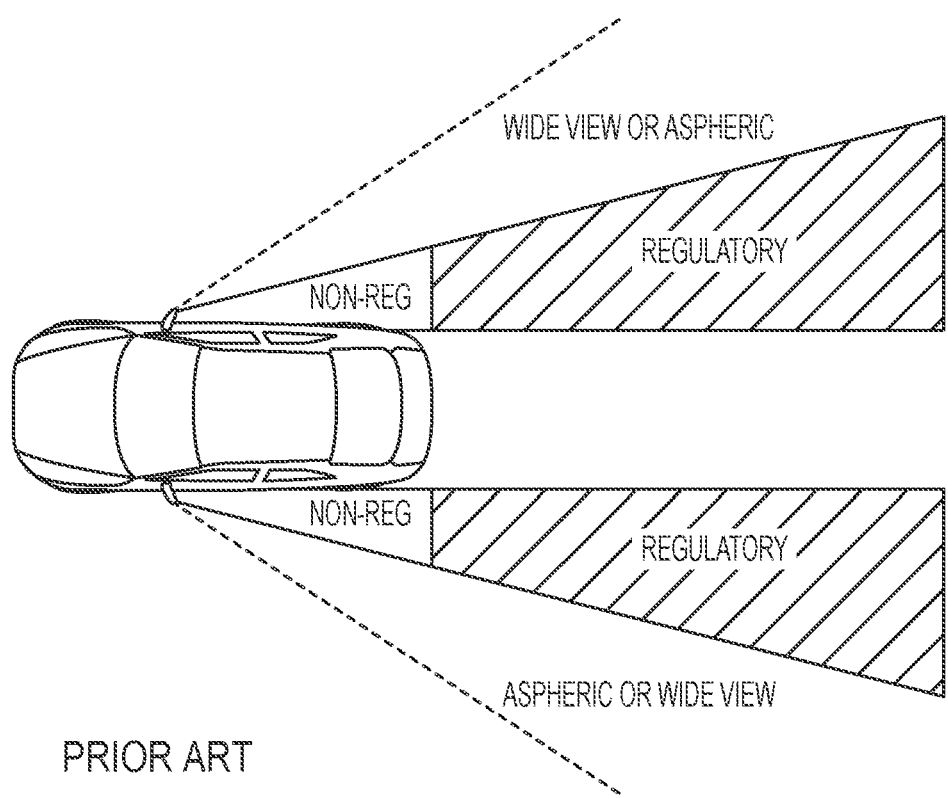
FIG. 1 is a plan view of a vehicle showing a typical rear vision system having two side exterior rearview mirrors that provide a regulation required rearward field of view and a selected wide angle field of view.

With the advent of camera monitoring systems providing a replacement of traditional mirror systems, the present invention provides an opportunity for mirrors to supplement camera systems. Traditionally, a mirror is located near the driver and provides a standard field of view, such as shown in FIG. 1. A camera mounted in the same position as the rearview mirror can generate a similar field of view, with one camera being mounted at each side of the vehicle.

Figure 2:
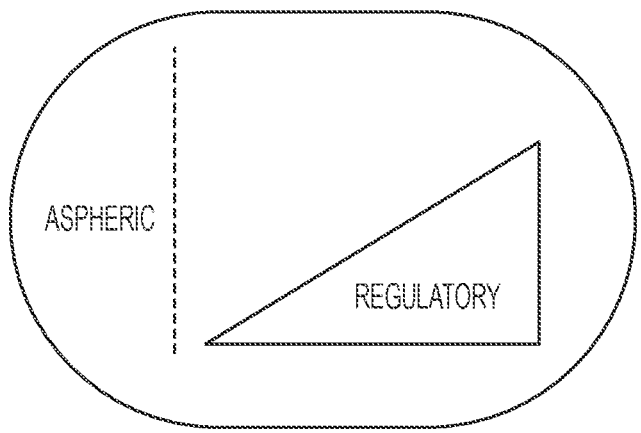
FIGS. 2 and 3 are plan views of typical exterior rearview mirror reflective elements that provide the views shown in FIG. 1.
Figure 3:
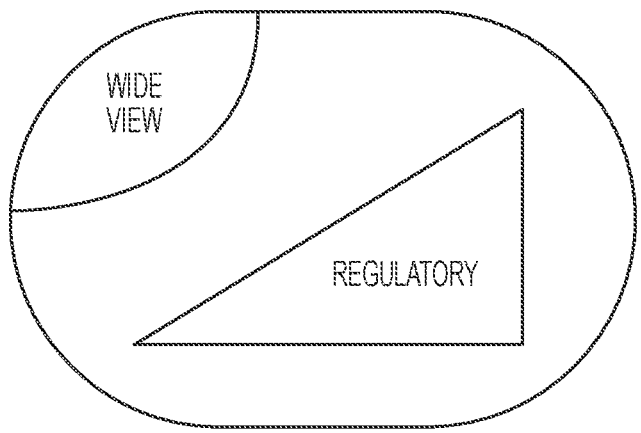

A traditional exterior rearview mirror has both a regulatory portion (that reflects a rearward field of view for viewing by the driver that encompasses a required region rearward and sideward of the vehicle) and an aspheric or wide view portion (such as shown in FIGS. 2 and 3).

In accordance with the present invention, a single camera 14 can be centrally mounted at the vehicle (such as at a rear window of the vehicle or rear panel or portion of the vehicle or the like), and has a field of view adequate to meet the regulatory requirements, but may not meet the non-regulatory and/or aspheric/wide view fields of view desired on many vehicles. With the single camera based vision system of the present invention, a small exterior mirror that has minimal or no regulatory field of view (but has a desired or selected wide angle field of view) can be implemented at each side of the vehicle so that the camera and exterior wide view mirrors cooperate to provide the regulatory and wide angle fields of view to the driver of the vehicle (such as shown in FIG. 4). The smaller exterior mirrors 16 may use a smaller radius of curvature than traditional mirror reflective elements, since the exterior mirrors 16 are not required to provide both the regulatory view and associated magnification. This allows the exterior mirrors 16 to be very small, very light weight, and aerodynamically much less resistive, as compared to larger conventional exterior rearview mirror assemblies.

In accordance with the present invention, a benefit can be achieved using mirror constructions where the portion of the overall mirror assembly exterior of the vehicle (and thus in the vehicle slipstream so as to add to aerodynamic drag and the like) is reduced or minimized, such as by utilizing aspects of the mirror systems described in U.S. Pat. Nos. 8,331,038; 5,914,815; 5,617,245 and/or 5,594,593, which are hereby incorporated herein by reference in their entireties, and where the placement and packaging of the camera is interior of the vehicle and thus not directly subject to external weather conditions, car washes and/or the like.

Mirror system requirements have long been known. Most areas of the world require a set of performance expectations to define not only what must be seen (field of view) by the driver of the vehicle, but also how it must be seen (magnification factor). A problem arises when attempting to replace a traditional outside mirror system with a camera monitoring system. For a traditional driver side exterior rearview mirror assembly of a vehicle, the magnification factor is defined. In the U.S., the requirement is unit magnification of the images reflected by the reflective element of a driver side exterior rearview mirror assembly. In the EU, the requirement is for a minimum bend radius of 1020 mm. These factors in combination with the required field of view (FOV) and the distance from the driver's eyes or ocular reception points define the parameters for the exterior rearview mirror design.

The camera captures images rearward and sideward of the vehicle and may communicate captured images or captured image data to a processor and/or display, which may be disposed inside the vehicle and remote from the vision system module or optionally that may be disposed at the interior side of the door at or near or associated with the vision system module (such as by utilizing aspects of the display systems described in International Publication No. WO 2013/067082, which is hereby incorporated herein by reference in its entirety). The driver thus can view the displayed video images as captured by the camera to view rearward of the vehicle and may view the wide angle exterior mirrors to view the sideward regions of the vehicle. Optionally, the reflective elements and vision system may utilize aspects of the mirror systems described in U.S. Pat. Nos. 8,917,437 and/or 8,491,137, and/or U.S. Publication Nos. US-2015-0002954; US-2014-0333770 and/or US-2014-0240811, which are hereby incorporated herein by reference in their entireties.

Optionally, the driver may adjust the field of view of the camera, such as via a user input or toggle in the vehicle, which may adjust the camera position or angle or orientation in order to adjust the rearward field of view of the camera relative to the vehicle at which the module is mounted. Optionally, the system may, responsive to a user input or the like, digitally or electronically adjust the displayed field of view, such as by panning or zooming in/out or the like, to provide the desired displayed image or images for viewing by the driver of the vehicle during normal operation of the vehicle. Optionally, the system may, responsive to a detection of a vehicle or object at the side lane adjacent to and rearward of the vehicle, adjust the displayed image to show the detected object or vehicle (such as by zooming in on the detected object or vehicle), such as in response to the driver actuating a turn signal indicator towards that side of the vehicle, in order to alert the driver of a potential hazard in changing lanes. Optionally, the camera may have a wide angle or fisheye lens to provide a wider angle field of view and the displayed images may be processed and/or displayed in a manner with reduced distortion so as to provide a substantially non-distorted rearward field of view to the driver of the vehicle.

Currently, there are efforts to implement camera monitoring systems that replace the rearview mirrors of vehicles, such as for passenger vehicles and commercial vehicles. It has been proposed to provide cameras that replicate the regulatory field of view requirements of mirrors on current production vehicles. However, many vehicles utilize additional features on the mirror that expand the actual field of view of the driver viewing the mirror beyond the regulatory field of view. This is desirable to consumers. Consumers are also often troubled by forward field of view obstructions caused by vehicle structures such as the vehicle "A" pillars or the like.

Figure 5:
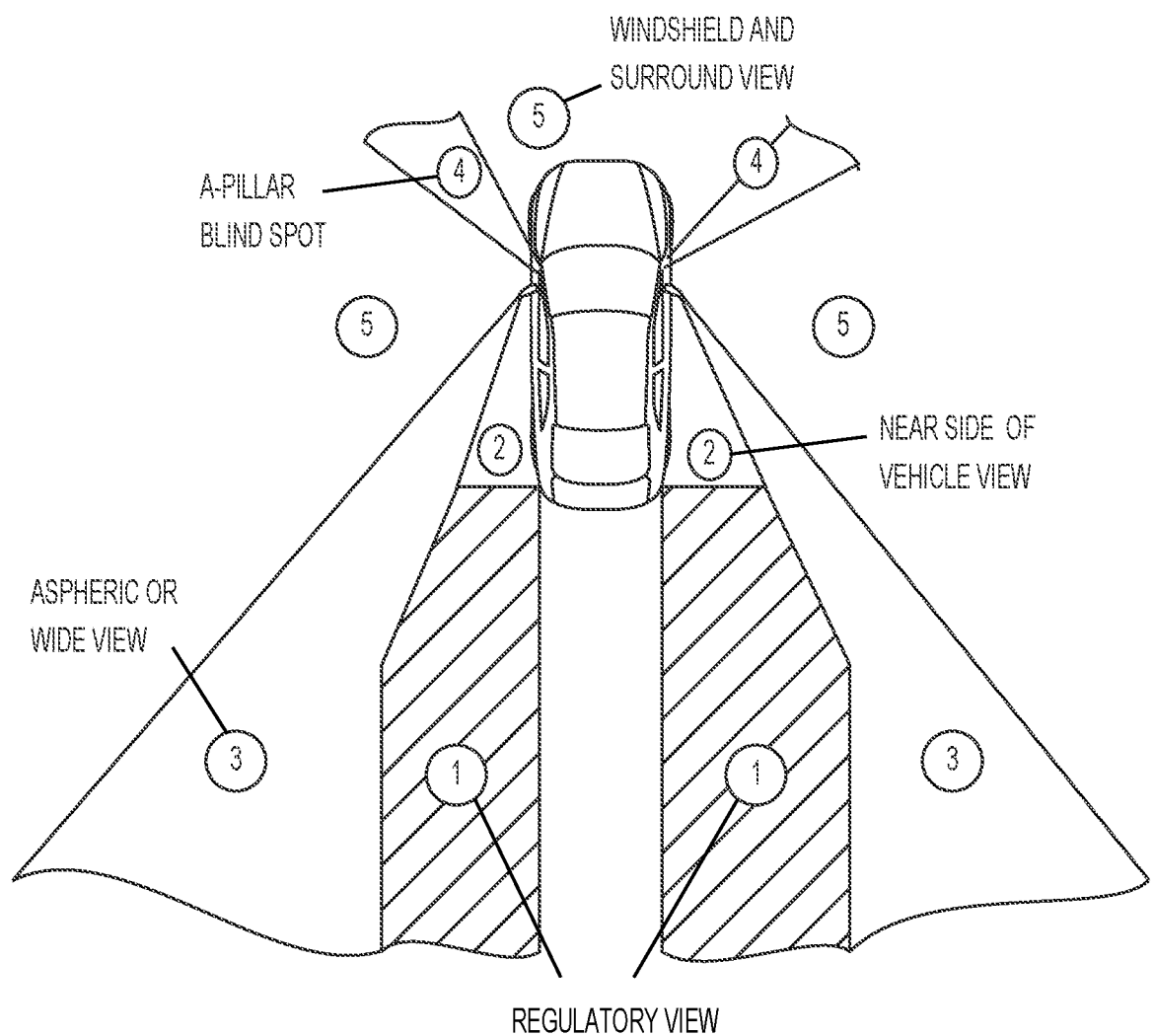
FIG. 5 is a plan view of a vehicle showing fields of view provided to a driver of the vehicle by exterior rearview mirrors and spotter mirrors, and showing other fields of view of the driver and blind spots.

As shown in FIG. 5, a driver of a vehicle may have or desire various fields of view, including a typical exterior mirror regulatory field of view 1, a field of view 2 of the area along the side of the vehicle (but not encompassed by the regulatory field of view), and an extended sideward/rearward field of view 3, such as may be provided by a spotter mirror or wide angle mirror element or aspheric mirror element or the like. The driver of the vehicle also has a forward field of view 5 through the windshield and forward of the vehicle, with blind spots or areas 4 due to the A-pillars of the vehicle.

Figure 6:
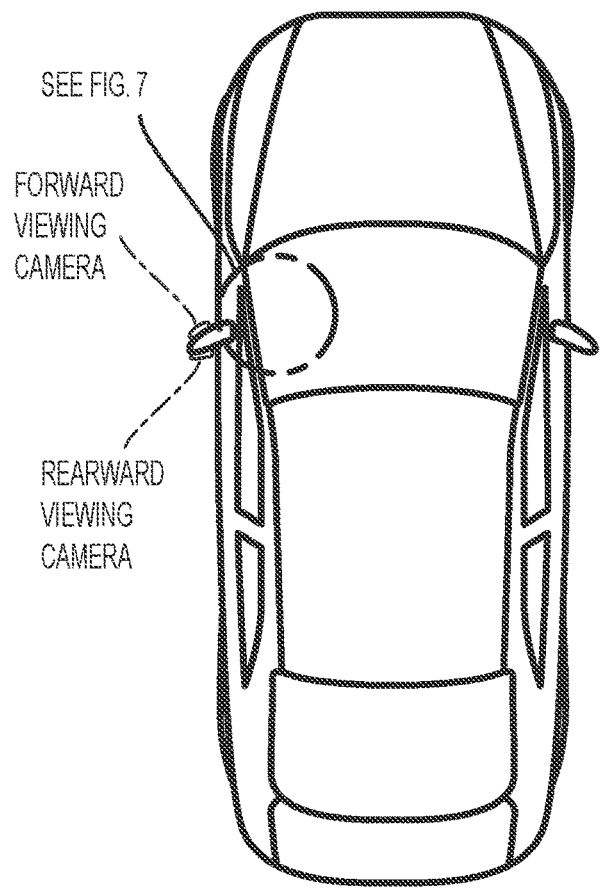
FIG. 6 is a plan view of a vehicle having a display system in accordance with the present invention.
Figure 7:
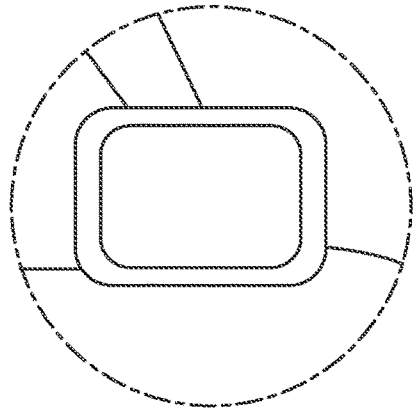
FIG. 7 is a perspective view of a display screen at an A-pillar of the vehicle.

The present invention (and such as can be seen with reference to FIGS. 6-8) provides a display system having a display screen (such as a relatively large display screen) at the A-pillar of the vehicle (such as by utilizing aspects of the display systems described in U.S. Publication No. US-2014-0285666 and/or International Application No. PCT/1616/52601, filed May 6, 2016, which are hereby incorporated herein by reference in their entireties). By configuring a large display at the A-pillar area and providing cameras at the vehicle (such as a rear camera, side cameras at the typical exterior mirror location, and side cameras at or near the A-pillar and having a field of view that encompasses area 4 and optionally part of areas 5 in FIG. 5) that collectively view all of the areas 1-5 in FIG. 5, the system may display images in a manner that allows the driver to view areas that may otherwise be blocked from view. The images displayed may be digitally rendered to make a virtual image of a mirror, complete with incorporation of any of the blind zone features that are used in the mirror.

Figure 8:
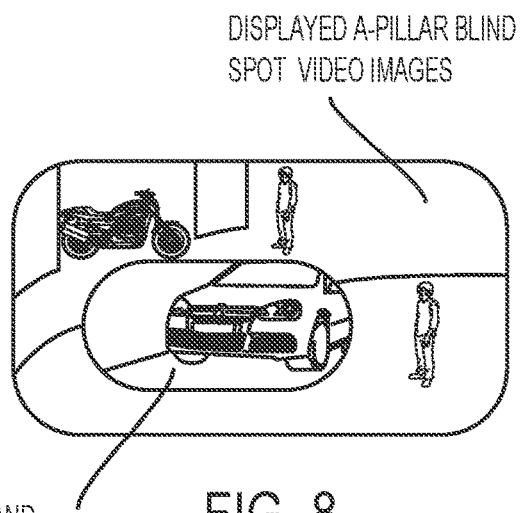
FIG. 8 is a plan view of the display screen of FIG. 7, showing display of images captured by multiple cameras disposed at the vehicle, shown with a displayed rearward image inset at a displayed sideward/forward image in accordance with the present invention.

For example, and such as shown in FIG. 8, the displayed image may include an image of a mirror reflective element of an exterior mirror that includes a rearward image as would be seen at the exterior mirror (and captured by a camera at a typical exterior mirror camera and/or a rear camera), and the displayed image includes images around the displayed reflective element that represent the sideward and forward field of view of the driver (as captured by one or more sideward and forward viewing cameras that capture images of the blind spot area created by the A-pillar). Thus, in addition to the virtually rendered image of the mirror, the displayed image includes images outside of the virtually rendered mirror image that are digitally configured to reduce or virtually eliminate the blind spot from the presence of the display as well as the blind spot from the A-pillar. One or more cameras may be disposed at the vehicle and may view generally sideward and/or forward of the driver to capture image data that is used to generate the displayed images of the portions of the scene that the driver cannot see due to the presence of the display screen and A-pillar.

Thus, the present invention may provide enhancement to the field of view of the driver via display of images derived from image data captured by one or more cameras viewing blind spot areas forward and sideward of the vehicle. The surrounding images displayed at the display screen are captured by one or more cameras that view the blind spot area outside of the A-pillar and optionally forward and/or rearward of that blind spot area, while the displayed virtual reflective element images are displayed over or inset at the displayed surrounding images such that, when the driver views the display screen, it provides images representative of a mirror reflective element (reflecting a rearward field of view) and the area forward and sideward of the vehicle in the direction of viewing by the driver (where the driver would view if the A-pillar were not there). The displayed virtual reflective element may be demarcated or circumscribed by a perimeter band or demarcation to enhance the distinction of the displayed rearward field of view from the displayed forward/sideward field of view.

The camera or sensor may comprise any type of imaging sensor or sensors, and may capture image data for image processing and/or display of video images, and may comprise any suitable camera or sensing device, such as, for example, an array of a plurality of photosensor elements arranged in at least 640 columns and 480 rows (at least a 640×480 imaging array, such as a megapixel imaging array or the like), with a respective lens focusing images onto respective portions of the array. The vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, which are all hereby incorporated herein by reference in their entireties.

Optionally, the mirror reflective element for a U.S. vehicle may utilize the size and shape of a larger mirror reflective element for a European vehicle (as required under European regulations), whereby a portion or portions of the reflective element (when used on a U.S. vehicle) may be used for a larger spotter mirror or the like. Current regulations require different mirrors between the U.S. market and the European (ECE) Market. In the ECE Markets (Europe typically followed by China, Japan and many other nations), the mirror regulations allow for the use of convex mirrors with aspheric mirror surfaces conjoined to allow for wider fields of view.

Figure 10:
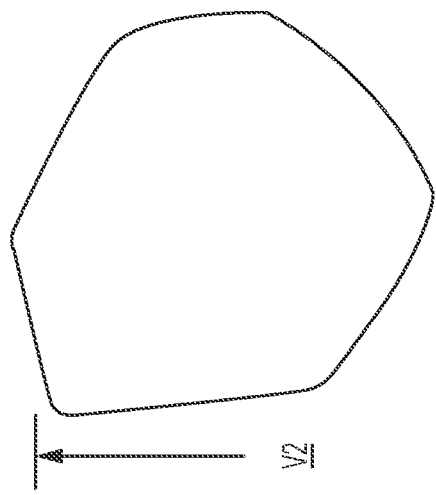
FIG. 10 is a plan view of a mirror reflective element that is sized and shaped to meet European regulatory requirements.
Figure 9:
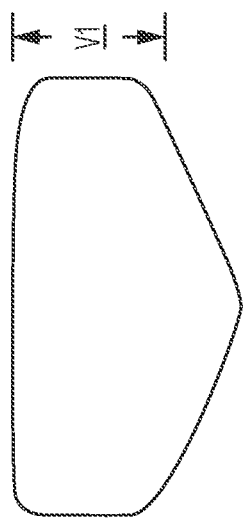
FIG. 9 is a plan view of a mirror reflective element that is sized and shaped to meet U.S. regulatory requirements.

Only the convex portion of the mirror can be used to satisfy the ECE field of view requirement. This field of view, together with the bend radius of the convex glass and the minimum height requirements requires ECE compliant mirrors to fall into a certain size range that typically exceeds the size required for vehicles in the USA. This is especially true for the vertical axis of the mirror reflective elements. As can be seen with reference to FIGS. 9 and 10, the North American mirror height (vertical size V1) can typically be less than about 50 percent of ECE mirror height (vertical size V2) due to the different regulatory requirements.

This often requires mirror manufacturers to either use two completely different mirror housings and designs or alternatively, the larger design is used for both (since the larger mirror design is acceptable in the U.S.). Typically, U.S. manufacturers will use different mirror designs for U.S. vehicle applications as compared to ECE vehicle applications, while European manufacturers may use the larger design for both vehicle applications.

Figure 11:
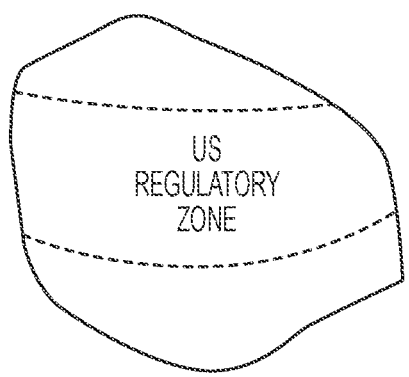
FIG. 11 is a plan view of another mirror reflective element sized and shaped to meet European regulatory requirements, with the U.S. regulatory zone or region shown at a center region of the large mirror reflective element.
Figure 12:
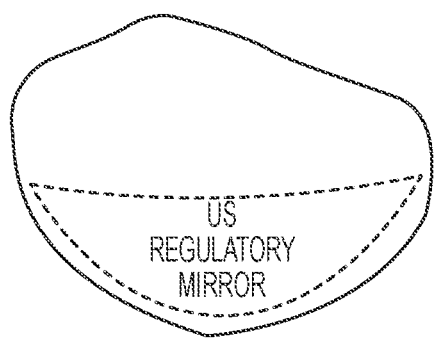
FIG. 12 is a plan view of another mirror reflective element sized and shaped to meet European regulatory requirements, with the U.S. regulatory zone or region shown at a lower region of the large mirror reflective element.
Figure 13:
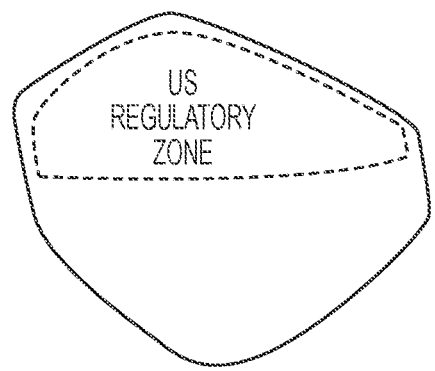
FIG. 13 is a plan view of another mirror reflective element sized and shaped to meet European regulatory requirements, with the U.S. regulatory zone or region shown at an upper region of the large mirror reflective element.

In situations where an OEM utilizes the larger of the two shapes, other solutions become available for vehicles sold in the U.S. type of markets. Because the mirror element (when used in the U.S.) typically has more vertical height than is required by regulations, the additional space can be used to create new spotter mirror approaches (such as by providing different curved reflective glass elements or surfaces or by providing display regions and displays and/or graphics and/or the like). For example, and such as can be seen with reference to FIGS. 11-13, the areas marked can be used to accommodate a variety of mirrors and optics to provide enhanced fields of view with various aesthetics, while still providing sufficient principal reflecting area that meets the U.S. regulations.

Figure 14:
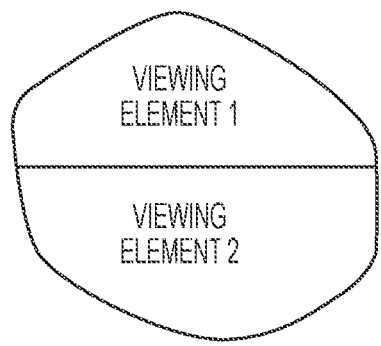
FIG. 14 is a plan view of another mirror reflective element sized and shaped to meet European regulatory requirements, with the U.S. regulatory zone or region shown at an upper or lower region of the large mirror reflective element and an auxiliary mirror established at the other of the upper or lower region in accordance with the present invention.
Figure 14A:
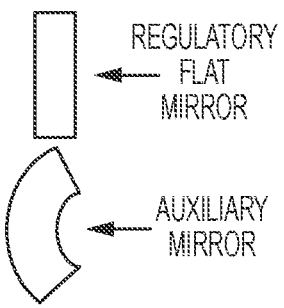
FIGS. 14A and 14B are side elevations of the mirror reflective element of FIG. 14, showing optional locations of the regulatory flat mirror and the auxiliary mirror.
Figure 14B:
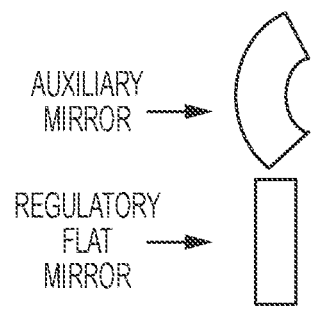

Optionally, a separate piece of glass can be provided with different sizing and sufficient separation visually, with one viewing element or reflective element at an upper region of the mirror reflective element and another viewing element or reflective element at a lower region of the mirror reflective element (FIG. 14). For example, and such as shown in FIG. 14A, the upper viewing element may comprise the regulatory or principal flat or slightly curved mirror reflective element and the lower viewing element may comprise an auxiliary mirror element, which may comprises a flat or convex or aspherical or cylindrical element that may be generally coplanar with the principal mirror element or may be angled or offset relative to the principal mirror element. Optionally, and such as shown in FIG. 14B, the lower viewing element may comprise the regulatory or principal flat or slightly curved mirror reflective element and the upper viewing element may comprise an auxiliary mirror element, which may comprises a flat or convex or aspherical or cylindrical element that may be generally coplanar with the principal mirror element or may be angled or offset relative to the principal mirror element.

Figure 15:
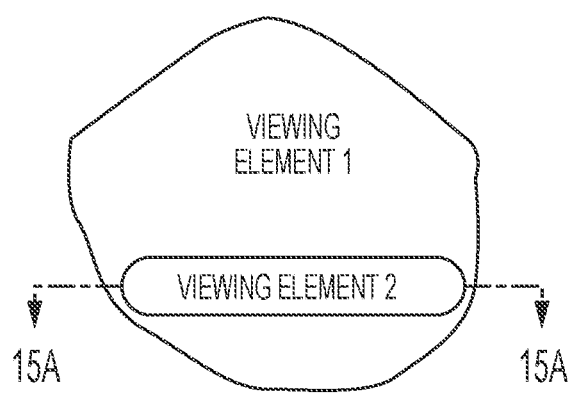
FIG. 15 is a plan view of another mirror reflective element sized and shaped to meet European regulatory requirements, with the U.S. regulatory zone or region shown at an upper region of the large mirror reflective element and with an auxiliary mirror portion established across a lower portion of the reflective element, such as via grinding or ablating the mirror glass in accordance with the present invention.
Figure 15B:
FIG. 15B is a sectional view of the mirror reflective element of FIG. 15 taken along a generally vertical line normal to the line A-A in FIG. 15.
Figure 15A:
FIG. 15A is a sectional view of the mirror reflective element taken along the line A-A in FIG. 15.

Optionally, and such as shown in FIGS. 15, 15A and 15B, the curved or cylindrical or aspheric features of an auxiliary mirror element can be ground into or assembled to the glass substrate of the mirror reflective element. As can be seen with reference to FIGS. 15A and 15B, the curved recess at the rear surface of the reflective element may be curved laterally across the reflective element (FIG. 15A) and not curved vertically across the reflective element (FIG. 15B). Such a curved recess may be established via grinding the rear surface of the reflective element glass substrate via a large grinding wheel that has a radius of curvature so that its curved surface is curved as is shown in FIG. 15A. The large grinding wheel thus may grind the curved recess at the rear surface of the glass substrate and may be moved vertically to establish the desired thickness (vertical dimension) of the curved recess. Variations of the reflective elements described above may be combined to take advantage of the additional reflective surface required in-between regulations.

Figure 16:
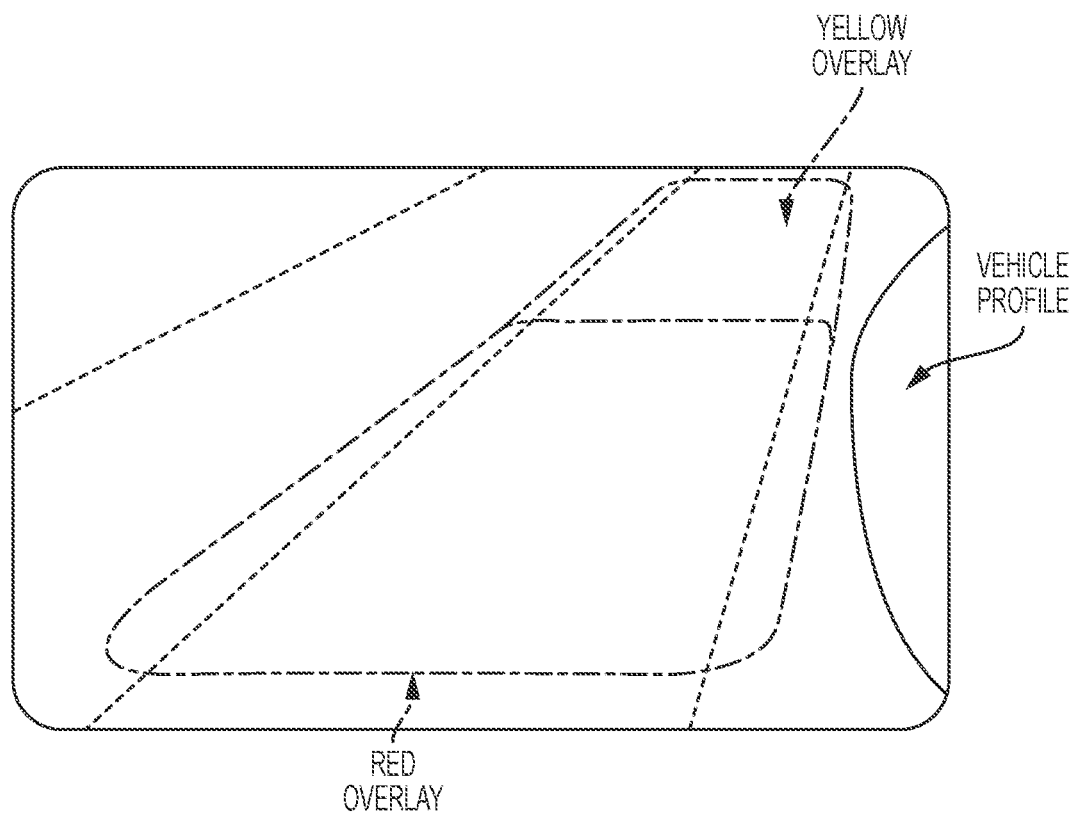
FIG. 16 is a plan view of another mirror reflective element, with graphic overlays provided in accordance with the present invention.

Optionally, overlays can be created at the exterior mirror reflective element to indicate safe distances for lane change assist. Such overlays can be incorporated with the reflective surface of the vehicle mirror element. This can be achieved by etching or ablation of reflective transmission of light through a reflector or selecting different levels or materials or thicknesses or colors of reflective material to create an overlay or pattern. The overlays may be created by backlighting and/or ablating and/or additional variations in the reflective and transmissive properties of the reflective element. For example, the reflective element may be modified to have a vehicle profile overlay and/or a red area overlay (where it is unsafe to change lanes if a vehicle is present in that area) and/or a yellow area overlay (where it may be safe to change lanes, but such lane change should proceed with caution), such as shown in FIG. 16. Thus, some of the added functionality from a camera monitoring system can be incorporated into a reflective mirror system at substantially lower cost. The camera monitoring system and/or the overlays may utilize aspects of the systems described in PCT Application No. PCT/1616/52601, filed May 6, 2016, which is hereby incorporated herein by reference in its entirety.

Optionally, the vision system module and/or the exterior mirror assembly may incorporate a blind spot indicator device or element and/or a turn signal indicator device or element, such as by utilizing aspects of the devices described in U.S. Pat. Nos. 8,786,704; 8,058,977; 7,944,371; 7,626,749; 7,492,281; 7,255,451; 6,198,409; 5,929,786 and/or 5,786,772, and/or U.S. Publication No. US-2014-0098230, which are hereby incorporated herein by reference in their entireties. The signal indicator or indication module may include or utilize aspects of various light modules or systems or devices, such as the types described in U.S. Pat. Nos. 7,626,749; 7,581,859; 7,289,037; 6,227,689; 6,582,109; 5,371,659; 5,497,306; 5,669,699; 5,823,654; 6,176,602 and/or 6,276,821, and/or U.S. Publication No. US-2006-0061008, which are hereby incorporated herein by reference in their entireties. Optionally, the exterior rearview mirror assembly may include a wide angle reflector at or integral with the reflective element, such as by utilizing aspects of the elements described in U.S. Pat. Nos. 7,748,856; 7,255,451; 7,195,381; 6,717,712; 7,126,456; 6,315,419; 7,097,312 and/or 6,522,451, which are hereby incorporated herein by reference in their entireties.

Figure 17:
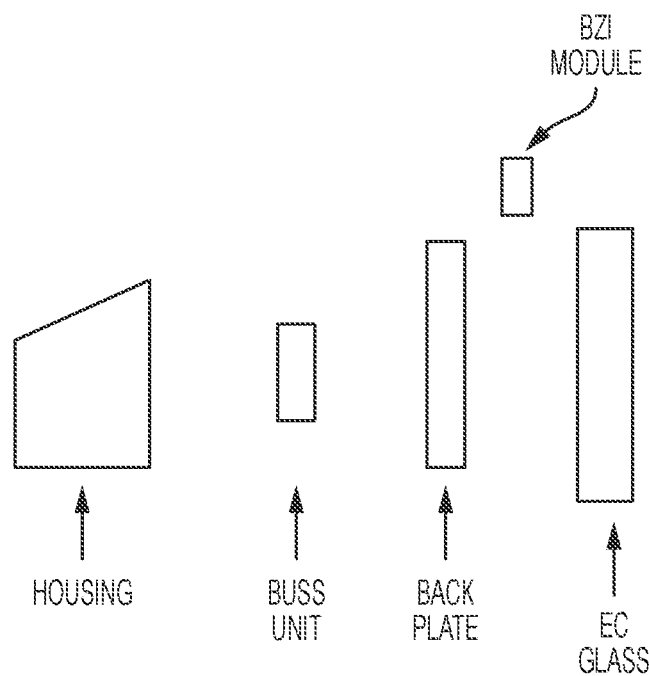
FIG. 17 is an exploded schematic showing a typical exterior mirror assembly with a separate blind zone indicator module.

Optionally, a blind zone module of the present invention may be incorporated into a bus unit of the exterior mirror to reduce parts and cost of the mirror assemblies. Typically, and such as shown in FIG. 17, an exterior rearview mirror assembly construction includes a housing, a bus unit, a back plate, heater pad and a mirror reflective element (such as an electro-optic reflective element or electrochromic reflective element or planar or non-planar reflective element or the like), with a separate blind zone indicator module located at the reflective element or mirror casing or back plate. With such an arrangement, all electrical connections are completed view wiring harnesses and leads of the mirror assembly and vehicle.

Figure 18:
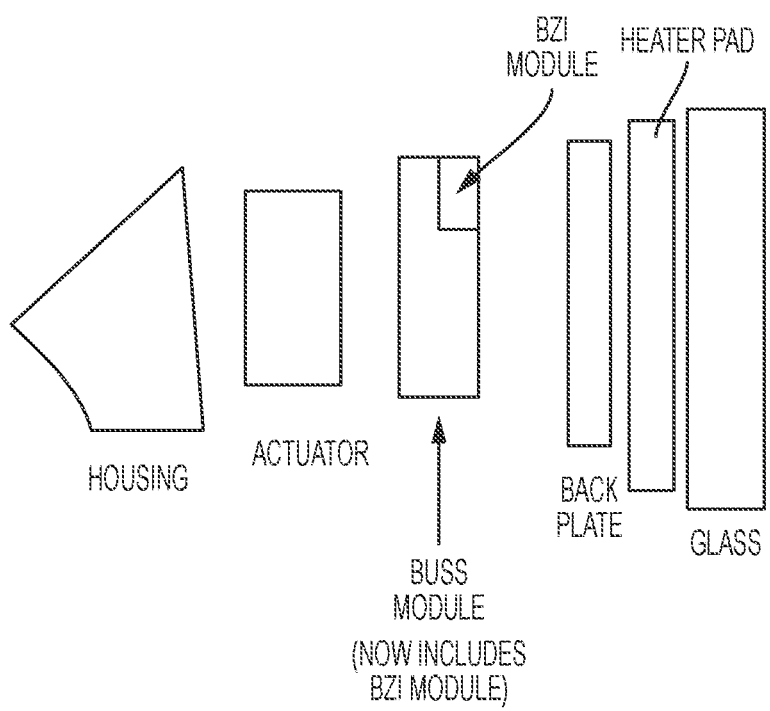
FIG. 18 is an exploded schematic showing an exterior mirror assembly with a blind zone indicator module integrated with a bus module of the mirror assembly in accordance with the present invention.

The present invention provides an exterior rearview mirror assembly construction that has a different stack of components to substantially reduce the cost of the mirror assembly. For example, and such as shown in FIG. 18, the blind zone indicator module can be incorporated into or integrated with the bus module. Thus, the present invention effectively utilizes the bus and heater pad as the circuit board at which the blind zone indicator module is attached or connected. Thus, the electrical connections can all be made at the heater pad, and everything (including the bus unit and actuator and blind zone indicator module and EC control circuitry and the like) may be connected to or plugged into connectors or circuits at the heater pad. Optionally, the present invention may provide a circuit module that is attached at the bus module board and the EC cell and heater pad may be electrically connected at the circuit module and/or bus module board. Then, the mirror assembly circuitry is connected to the vehicle via a single harness (such as a wiring harness comprising three wires) that electrically connects at the bus module. By changing the sequence of the assembly (the blind zone indicator is installed with the bus module and not with or after the back plate), multiple modules and wiring harnesses and electrical connections are eliminated. Thus, the present invention substantially reduces the wiring harnesses and electrical connections in the mirror assembly, thus reducing assembly processes and overall cost of the exterior rearview mirror assemblies.

Optionally, the heater pad or film or element at a rear surface of the mirror reflective element may comprise a mirror defrost/demisting heater and may provide an anti-fogging of de-fogging feature to the exterior mirror assembly, and may utilize aspects of the heater elements or pads described in U.S. Pat. Nos. 8,058,977; 7,400,435; 5,808,777; 5,610,756 and/or 5,446,576, and/or U.S. Publication Nos. US-2008-0011733 and/or US-2011-0286096, which are hereby incorporated herein by reference in their entireties. The heater element may include electrical contacts that extend rearward therefrom and through an aperture of attaching portion of back plate for electrical connection to a wire harness or connector of the mirror assembly, or the back plate and/or heater pad may include suitable electrical connectors and connections incorporated therein (such as by utilizing aspects of the mirror assembly described in U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like). Optionally, the heater pad may comprise a screen printed heater pad. For example, the heater pad can be printed on the back of the mirror reflective element (such as at the fourth or rear surface of the rear substrate). Such coatings may be printed and then cured at around 120 degrees C. or lower, making this process compatible with already formed laminate type EC mirror elements, such as those described in U.S. Pat. No. 5,724,187, which is hereby incorporated herein by reference in its entirety. This would make it compatible with EC mirrors.

The exterior rearview mirror assembly may have a frameless mirror reflective element, such that the perimeter edges of the mirror reflective element are not encapsulated by a bezel or mirror back plate or the like. In order to protect such frameless outside mirrors from damage, the present invention may equip the mirror with an automatic folding mechanism to protect the reflective surface from damage when the vehicle is parked. This greatly reduces the scenarios that may cause damage to a frameless outside mirror. Thus, for example, the exterior rearview mirror assembly may comprise a powerfold mirror assembly and a control of the powerfold actuator is operable to fold the mirror head inboard so that the reflective element is angled towards and along the side of the vehicle at which the mirror assembly is attached, such as responsive to a determination that the vehicle is parked (such as when the vehicle transmission is shifted to "park" or such as when the vehicle ignition is off). The control may be operable to fold the mirror head outboard when the ignition is turned on or when the vehicle transmission is shifted out of park. The powerfold mechanism may utilize aspects of the mirror assemblies described in U.S. Pat. Nos. 9,067,541; 8,915,601 and/or 7,093,946, and/or U.S. Publication Nos. US-2014-0376119 and/or US-2015-0097955, which are hereby incorporated herein by reference in their entireties.

Optionally, the vision system module and/or exterior casing or housing at the side of the vehicle may also comprise a ground illumination light or puddle lamp, which provides downwardly directed illumination (and which may provide a back lit icon or indicia or logo or the like), such as by utilizing aspects of the illumination systems described in U.S. Pat. Nos. 8,764,256; 8,333,492; 5,371,659, 5,669, 699, 5,823,654 and/or 5,497,305, which are hereby incorporated herein by reference in their entireties. Optionally, the module and/or casing may comprise a cornering light and a puddle lamp and turn signal light, and may have a wrap-around style turn signal at the exterior mirror that may be fitted with a prism lens or the like to project light in the appropriate direction and/or toward the targeted location. The module and/or casing thus may include one or more illumination sources and one or more lenses or optics or light pipes or the like to distribute or direct illumination toward the appropriate targeted areas.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,492,281; 7,038,577; 6,882, 287; 6,198,409; 5,929,786; 5,786,772 and/or 7,720,580, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,038,577; 6,882,287; 6,198,409; 5,929,786; 5,786,772; 7,881,496 and/or 7,720,580, and/or of the reverse or backup aid systems, such as the rearwardly directed vehicle vision systems described in U.S. Pat. Nos. 5,550,677; 5,760,962; 5,670, 935; 6,201,642; 6,396,397; 6,498,620; 6,717,610 6,757,109 and/or 7,005,974, and/or of the automatic headlamp controls described in U.S. Pat. Nos. 5,796,094; 5,715,093 and/or 7,526,103, and/or of the rain sensors described in U.S. Pat. Nos. 6,250,148 and/or 6,341,523, and/or of other imaging systems, such as the types described in U.S. Pat. Nos.

6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and/or 5,796,094, with all of the above referenced U.S. patents, patent applications and provisional applications and PCT applications being hereby incorporated herein by reference in their entireties.

Optionally, the mirror assembly may include or may be associated with one or more displays (such as a display inside the vehicle for displaying images captured by the camera or cameras), such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 9,041,806; 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or U.S. Publication Nos. US-2006-0061008; US-2006-0050018; US-2009-0015736 and/or US-2009-0015736, which are all hereby incorporated herein by reference in their entireties.

Optionally, the exterior assembly or module may include a camera or imaging sensor that may be part of a multi-camera system, such as an object detection system or a surround view or "bird's eye view" display system or a Japan View™ vision system or the like (now common in exterior mirrors used in Japan where a video camera is located in the exterior mirror assembly at the side of a vehicle and viewing generally downwardly to allow the driver of the vehicle to view on an interior-cabin mounted video screen whether the likes of a child might be present in the blindzone to the side of the vehicle), such as by utilizing aspects of the vision systems described in U.S. Publication No. US-2012-0162427, and/or International Publication Nos. WO 2010/099416; WO 2011/028686; WO 2012/145822; WO 2012/075250; WO 2013/019795; WO 2012-075250; WO 2013/081985; WO 2013/086249 and/or WO 2013/109869, which are hereby incorporated herein by reference in their entireties. Thus, the multi-camera vision system may provide a video display of images captured by an exterior mirror-mounted camera and may function to detect the presence of an object or child or the like at the side of the vehicle (and/or forwardly and/or rearward of the vehicle). The light module of the present invention can be used in conjunction with such a vision system to have its principal illumination beam directed towards the area within the field of view of the camera to enhance imaging and/or to enhance detection and/or identification and/or interrogation of objects in the camera's field of view generally at the side of the vehicle and optionally forwardly and/or rearwardly of the vehicle.

The mirror reflector or reflective element may comprise any suitable construction, such as, for example, a mirror assembly with the reflective element being nested in the mirror casing and with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or International Publication Nos. WO 2010/124064; WO 2011/044312; WO 2012/051500; WO 2013/071070 and/or WO 2013/126719, which are all hereby incorporated herein by reference in their entireties (and with electrochromic and prismatic mirrors of such construction are commercially available from the assignee of this application under the trade name INFINITY™ mirror).

Changes and modifications in the specifically described embodiments may be carried out without departing from the principles of the present invention, which is intended to be limited only by the scope of the appended claims as interpreted according to the principles of patent law.

The invention claimed is:

1. A vehicular rearview vision system, said vehicular rearview vision system comprising:

a driver-side display device disposed at an interior driver side region of a vehicle and viewable by a driver of the vehicle;

a first camera disposed at the vehicle so as to have at least a rearward and sideward field of view;

a second camera disposed at a driver side of the vehicle so as to have at least a sideward and forward field of view that at least partially views an A-pillar blind spot region forward and sideward of a driver-side A-pillar of the vehicle, wherein the A-pillar blind spot region is at least in part caused by the driver-side A-pillar of the vehicle at least partially blocking the driver's view forward and sideward of the driver at the driver side of the vehicle;

wherein said driver-side display device displays video images derived from image data captured by said first camera, and wherein said driver-side display device displays driver-side A-pillar blind spot video images derived from image data captured by said second camera; and wherein the displayed rearview video images are at least partially surrounded by and discrete and discernible from the displayed driver-side A-pillar blind spot video images.

2. The vehicular rearview vision system of claim 1, wherein image data captured by said first camera is processed by an image processor to determine presence of an object in the field of view of said first camera.

3. The vehicular rearview vision system of claim 2, wherein image data captured by said first camera is used for a multi-camera surround view system of the vehicle.

4. The vehicular rearview vision system of claim 3, wherein image data captured by said second camera is used as part of the multi-camera surround view system of the vehicle.

5. The vehicular rearview vision system of claim 2, wherein, responsive to detection of the object present sideward and rearward of the vehicle and in the field of view of said first camera, the displayed rearview video images are adjusted to enhance viewability by the driver of the displayed video images of the detected object.

6. The vehicular rearview vision system of claim 5, wherein the displayed rearview video images are electronically adjusted to zoom in on the detected object.

7. The vehicular rearview vision system of claim 1, wherein the displayed rearview video images are adjusted responsive to actuation of a user input in the vehicle.

8. The vehicular rearview vision system of claim 1, wherein said driver-side display device demarcates the displayed rearview video images by displaying a perimeter band that circumscribes the displayed rearview video images.

9. The vehicular rearview vision system of claim 1, wherein said first camera is disposed at a driver-side exterior rearview mirror assembly of the vehicle.

10. The vehicular rearview vision system of claim 1, wherein said second camera is disposed at a driver-side exterior rearview mirror assembly of the vehicle.

11. The vehicular rearview vision system of claim 1, wherein said display driver-side device is disposed at an interior side of the driver-side A-pillar of the vehicle.

12. A vehicular rearview vision system, said vehicular rearview vision system comprising:
a driver-side display device disposed at an interior driver-side region of a vehicle and viewable by a driver of the vehicle;
a passenger-side display device disposed at an interior passenger-side region of the vehicle and viewable by a driver of the vehicle;
a rear camera disposed at the vehicle so as to have a rearward and sideward field of view;
a driver-side camera disposed at a driver side of the vehicle so as to have a sideward and forward field of view that at least partially views a driver-side A-pillar blind spot region forward and sideward of a driver-side A-pillar of the vehicle, wherein the driver-side A-pillar blind spot region is at least in part caused by the driver-side A-pillar of the vehicle blocking the driver's view forward and sideward of the driver at the driver side of the vehicle;
a passenger-side camera disposed at a passenger side of the vehicle so as to have a sideward and forward field of view that at least partially views a passenger-side A-pillar blind spot region forward and sideward of a passenger-side A-pillar of the vehicle, wherein the passenger-side A-pillar blind spot region is at least in part caused by the passenger-side A-pillar of the vehicle blocking the driver's view forward and sideward of the driver at the passenger side of the vehicle;
wherein image data captured by said rear camera, said driver-side camera and said passenger-side camera are used for a multi-camera surround view system of the vehicle;
wherein said driver-side display device displays driver-side rearview video images derived from image data captured by said rear camera, and wherein said driver-side display device displays driver-side A-pillar blind spot video images derived from image data captured by said driver-side camera;
wherein the driver-side rearview video images displayed at said driver-side display device are at least partially surrounded by and discrete and discernable from the displayed driver-side A-pillar blind spot video images;
wherein said passenger-side display device displays passenger-side rearview video images derived from image data captured by said rear camera, and wherein said passenger-side display device displays passenger-side A-pillar blind spot video images derived from image data captured by said passenger-side camera; and
wherein the passenger-side rearview video images displayed at said passenger-side display device are at least partially surrounded by and discrete and discernable from the displayed passenger-side A-pillar blind spot video images.

13. The vehicular rearview vision system of claim 12, wherein said driver-side display device demarcates the video images displayed at said driver-side display device by displaying a perimeter band that circumscribes the displayed driver-side rearview video images, and wherein said passenger-side display device demarcates the video images displayed at said passenger-side display device by displaying a perimeter band that circumscribes the displayed passenger-side rearview video images.

14. The vehicular rearview vision system of claim 12, wherein image data captured by said rear camera is processed by an image processor to determine presence of an object in the field of view of said rear camera.

15. The vehicular rearview vision system of claim 12, wherein image data captured by said rear camera is used for a multi-camera surround view system of the vehicle.

16. The vehicular rearview vision system of claim 15, wherein image data captured by said driver-side camera and image data captured by said passenger-side camera is used for a multi-camera surround view system of the vehicle.

17. A vehicular rearview vision system, said vehicular rearview vision system comprising:
a driver-side display device disposed at a driver-side A-pillar of a vehicle and viewable by a driver of the vehicle;
a first camera disposed at the vehicle so as to have at least a rearward and sideward field of view;
wherein image data captured by said first camera is processed by an image processor to determine presence of an object in the field of view of said first camera;
a second camera disposed at a driver side of the vehicle so as to have at least a sideward and forward field of view that at least partially views an A-pillar blind spot region forward and sideward of the driver-side A-pillar of the vehicle, wherein the A-pillar blind spot region is at least in part caused by the driver-side A-pillar of the vehicle at least partially blocking the driver's view forward and sideward of the driver at the driver side of the vehicle;
wherein said driver-side display device displays video images derived from image data captured by said first camera, and wherein said driver-side display device displays driver-side A-pillar blind spot video images derived from image data captured by said second camera;
wherein the displayed rearview video images and the displayed driver-side A-pillar blind spot video images are displayed by said driver-side display device at the same time, with the displayed rearview video images at least partially surrounded by and discrete and discernible from the displayed driver-side A-pillar blind spot video images; and
wherein the displayed rearview video images are displayed at least in part responsive to detection of the object present sideward and rearward of the vehicle and in the field of view of said first camera.

18. The vehicular rearview vision system of claim 17, wherein image data captured by said first camera is used for a multi-camera surround view system of the vehicle.

19. The vehicular rearview vision system of claim 18, wherein image data captured by said second camera is used as part of the multi-camera surround view system of the vehicle.

20. The vehicular rearview vision system of claim 17, wherein, responsive to detection of the object present sideward and rearward of the vehicle and in the field of view of said first camera, the displayed rearview video images are adjusted to enhance viewability by the driver of the displayed video images of the detected object.

21. The vehicular rearview vision system of claim 20, wherein the displayed rearview video images are electronically adjusted to zoom in on the detected object.

22. The vehicular rearview vision system of claim 17, wherein the displayed rearview video images are adjusted responsive to actuation of a user input in the vehicle.

23. The vehicular rearview vision system of claim 17, wherein said driver-side display device demarcates the displayed rearview video images by displaying a perimeter band that circumscribes the displayed rearview video images.

24. The vehicular rearview vision system of claim 17, wherein said first camera is disposed at a driver-side exterior rearview mirror assembly of the vehicle.

25. The vehicular rearview vision system of claim 17, wherein said second camera is disposed at a driver-side exterior rearview mirror assembly of the vehicle.

\* \* \* \* \*

UNITED STATES PATENT AND TRADEMARK OFFICE
CERTIFICATE OF CORRECTION

PATENT NO. : 10,960,822 B2  
APPLICATION NO. : 16/693509  
DATED : March 30, 2021  
INVENTOR(S) : Michael J. Baur Page 1 of 1

It is certified that error appears in the above-identified patent and that said Letters Patent is hereby corrected as shown below:

In the Specification

Column 5  
Lines 34-35, "PCT/1616/52601" should be --PCT/IB16/52601--

Column 8  
Line 21, "PCT/1616/52601" should be --PCT/IB16/52601--

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*